Sept. 12, 1933.    F. A. BEYER, JR    1,926,026
METHOD OF MANUFACTURING PACKING RINGS
Filed Sept. 2, 1930    2 Sheets-Sheet 1
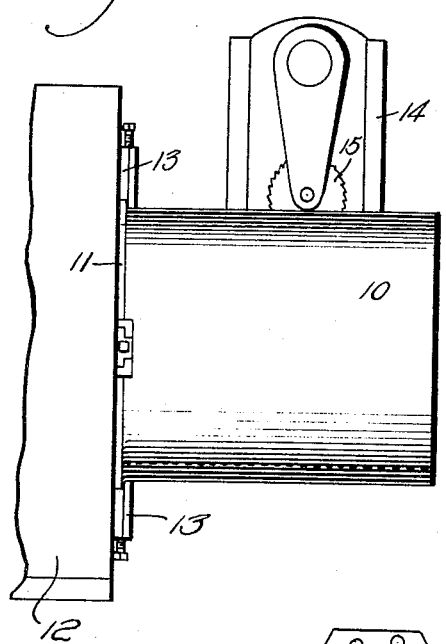
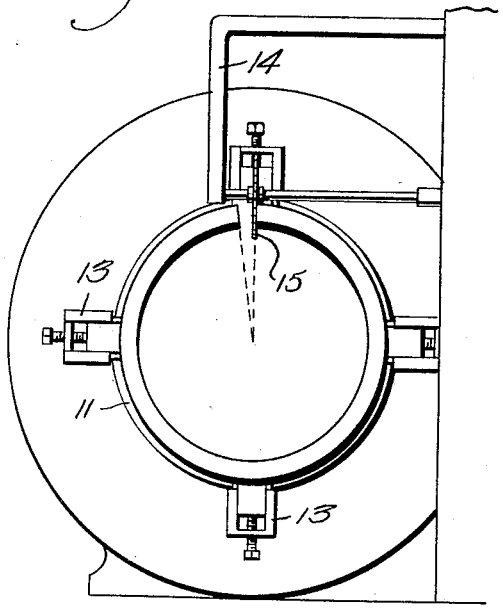
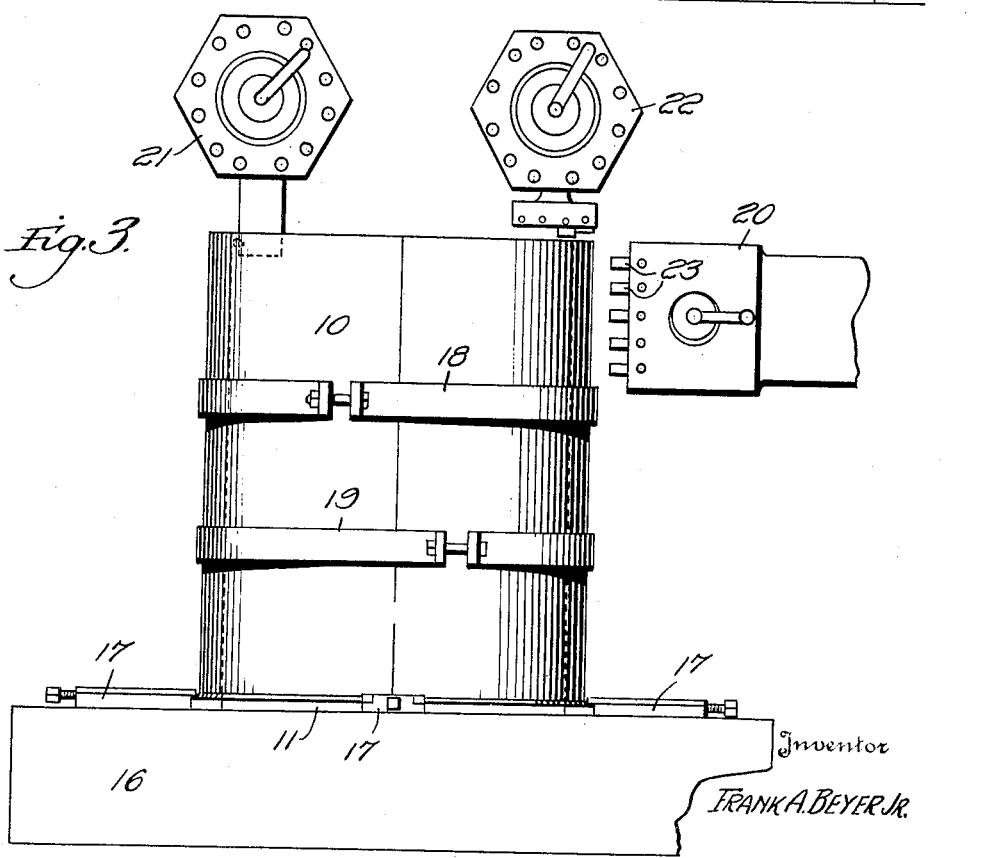
Inventor
FRANK A. BEYER Jr.
By
C. L. Parker Jr.
Attorney Sept. 12, 1933.     F. A. BEYER, JR     1,926,026
METHOD OF MANUFACTURING PACKING RINGS
Filed Sept. 2, 1930      2 Sheets-Sheet 2
Fig. 4.
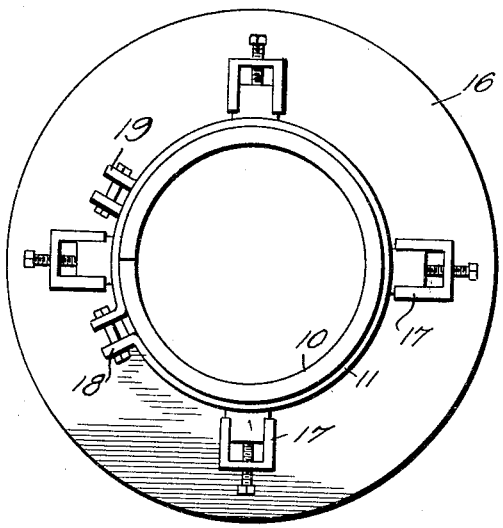
Fig. 5.
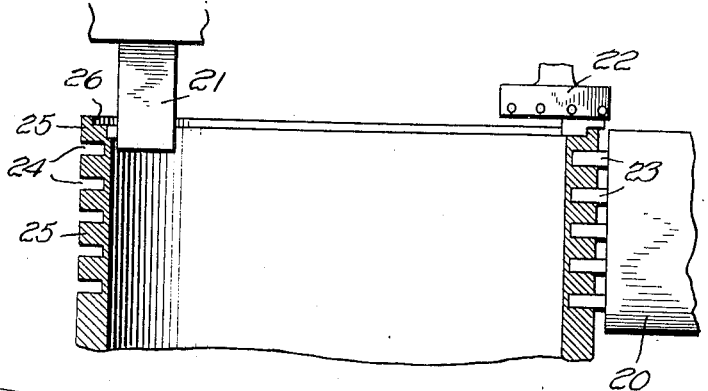
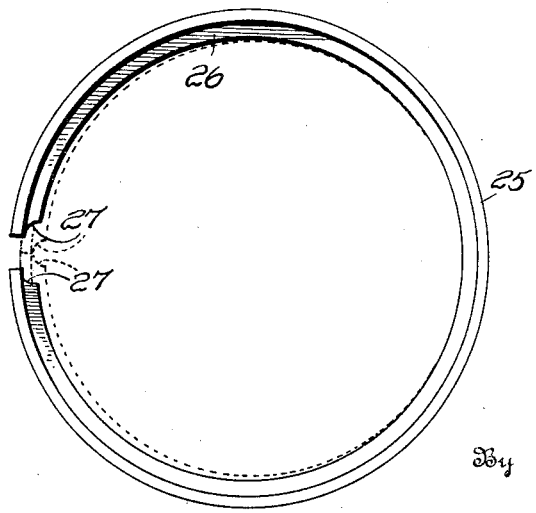
Fig. 6.
Inventor
FRANK A. BEYER JR
By
C. L. Parker Jr.
Attorney Patented Sept. 12, 1933

1,926,026

UNITED STATES PATENT OFFICE 1,926,026

METHOD OF MANUFACTURING PACKING RINGS

Frank A. Beyer, Jr., Springfield, Mo.

Application September 2, 1930
Serial No. 479,314

3 Claims. (Cl. 29—156.62)

This invention relates to an improved method of manufacturing packing rings for valves, cylinders and the like, particularly adapted for use in locomotive engines. While especially suited for use in such engines, the rings are nevertheless useful wherever required.

Heretofore, it has been customary in the manufacture of packing rings to produce single, solid rings normally of greater diameter than the cylinder in which they are to be used. Each ring had to be separately cut across and a piece taken out so that each ring could be compressed to provide the necessary resiliency to insure contact with the cylinder walls. Such rings, however, did not, when compressed in the manner described, retain their true circular shape, there being a tendency to become distorted, causing unequal bearing on the cylinder walls.

Accordingly, it is an object of this invention to provide a ring of the character referred to that can be made resilient before it is formed, whereby when the ring is compressed into a cylinder, the interior and exterior surfaces of the ring retain their perfect circular shape, being absolutely concentric. Such a ring can be readily slipped into a cylinder without strain or distortion and will insure a perfect fit throughout the contacting surfaces of the ring on the cylinder wall, thus providing numerous advantages such as, increasing the efficiency of the engine, affording economy in fuel consumption and reduction, if not elimination of loss of compression.

Another object is to provide a novel method of manufacturing rings of the character referred to.

A further object is the provision of novel steps in the method of manufacturing the rings which insure the production of regular and well fitting rings.

Other objects and advantages will become apparent from the following description.

In the drawings I have shown the various steps of my method. In this showing:
Figure 1 is a side elevation of the ring tub being split lengthwise, Figure 2 is an end elevation of same, Figure 3 is a plan view showing the tub clamped on a lathe and showing generally the three types of tools used in producing the rings, Figure 4 is an end elevation of the showing in Figure 3 with the tools omitted, Figure 5 is a partial sectional view through the ring tub showing the operation of the tools on the tub, and Figure 6 shows a finished ring.

Referring to the drawings, the numeral 10 indicates a ring tub preferably cast in cylindrical form with an annular rim or flange 11 on one end thereof. The tub is placed on a milling machine or the like indicated by the numeral 12 and clamped thereto by means of suitable clamps 13 which engage the flange 11 to properly position the tub. A dividing head 14 provided with a cutting member 15 is then arranged in position to split the tub radially its entire length. The dividing head is then moved to again split the tub radially its entire length whereby a small longitudinal strip will be cut from the tub, leaving an opening the size of which may vary according to the diameter of the tub and the amount of resiliency or snap required for the rings. Each cut should be made in planes extending from the same center and preferably in planes extending from the center of the tub, as indicated in dotted lines in Figure 2, whereby both sides of the opening fit perfectly when the tub is pulled together for the next operation.

After the correct opening is provided in the tub, the latter is removed from the member 12 and placed on a boring mill or lathe, indicated by the numeral 16. Clamps 17 engage the flange 11 to securely hold the tub in position and these clamps are designed to pull in two directions whereby the opening in the tub will be closed without causing the tub to bulge or pull out of round. Circular clamps 18 and 19 are then placed around the tub at spaced intervals to assist in holding the sides of the opening together as shown in Figures 3 and 4. When the tub has been properly secured and clamped it is turned, bored and the rings are formed.

In Figure 3, I have shown generally the heads of three tools to be used in turning, boring and forming the rings and these tools will be referred to by the numbers 20, 21 and 22 respectively. The tool 20 is provided with a plurality of spaced cutting blades 23. I have shown the tool 20 as being provided with five of the blades 23, but more or less than this number may be used, depending upon the number of rings it is desired to secure at each operation of the tool 20.

The machine 16 is operated to turn the tub and the tool 20 is arranged whereby one of the blades 23 will cut the outside surface of the tub from the free end down to the clamp 18 to a true cylinder of a given diameter according to the size of ring desired. Then the tool 20 is placed substantially in the position shown in Figure 3 and the five blades 23 are simultaneously run into the tub a given distance previously calculated for the depth of the rings. The blades 23 should not be permitted to go entirely through the tub and the desired depth should be reached when the blades are a slight distance from the interior of the tub, as shown in Figure 5.

After the tub has been cut by the blades 23 a plurality of circumferential grooves 24 are formed in the tub. The tool 21 is then put in operation to cut the inside surface of the tub inwardly from the free end thereof, to form the interior surface of the tub concentric with the outer surface, as shown in Figure 5. It will be obvious that when the tool 21 reaches the first groove 24, the first ring 25 will become separated from the tub. However, before the first ring becomes separated from the tub it is desirious to form an offset 26 in the ring, and accordingly the tool 22 which forms the offset, as shown in Figure 5, is placed in operation to put the offset in the first ring while the tool 21 is cutting the inside surface of the tub. By predetermining the speed of the tool 21, the offset 26 may be formed on the first ring by the tool 22 before the tool 21 reaches the first groove 24 to separate the ring from the tub. The size of the offset 26 will obviously depend upon the size of the ring and will vary with different sized rings.

After the first ring 25 has been formed and separated from the tub, the operation of the tools 21 and 22 is continued as described until each successive ring 25 is formed and separated. The number of rings formed and separated during continuous operation of the tools 21 and 22 depends upon the number of grooves 24 formed in the tub, and as the present embodiment shows five grooves 24 formed by the five blades 23, it will be obvious that five rings may be formed and separated while continually operating the tools 21 and 22.

When the desired number of rings have been cut from the tub, the clamp 18 is removed and the operations repeated until an additional set of rings are obtained. After the second set of rings are obtained, the lower clamp 19 is removed and the operations repeated until a third set of rings are secured, leaving only a small portion of the tub adjacent the clamps 17. In the embodiment shown it is therefore, possible to obtain fifteen rings from a tub, having their inner and outer surfaces concentric and which will spring apart slightly at their openings when separated from the tub. However, it will be apparent that when the ends of each ring are forced together the outer and inner surface will be truly concentric and the rings will properly engage any cylinders for which they are made.

The rings are available for use after being cut and formed as described, but it is preferred that each ring be taken to a micro-grinder or the like, and ground both on the spider side and the valve body to a micrometer snap guage, after which the dowel grooves 27 are cut into each ring. The rings are then stencilled according to the gauge they have been tried in and are ready for installing by a mechanic without having to be fitted.

It is to be noted that the ring tub is taken directly from the foundry and the strip is cut out of same without first turning the tub. It has been found that a ring cut from a tub that has been turned and bored before it is cut longitudinally loses over 60 per cent. of its resiliency whereas a ring cut from a rough tub that has not been turned and bored before the tub is split has substantially the same resiliency, that is, substantially the same size opening left in it as was at first cut from the tub.

Not all packing rings need be shaped the particular shape shown in the drawings, as there are other shaped rings also now in use in locomotives in this country, and it is to be understood that my invention may readily be used in the production of packing rings of other than the particular shape shown.

It will be obvious that I have provided a novel method of producing packing rings which are made resilient before being wholly formed, which are truly circular in shape and which will truly fit when arranged in a cylinder.

It is to be understood that the form of my invention herewith shown and described and the method of producing same are to be taken as preferred examples of the same, and that various changes in the shape, size, and arrangement of parts and in the manner of carrying out the method, may be resorted to without departing from the spirit of the invention, or the scope of the subjoined claims.

I claim:

1. The method of manufacturing packing rings which comprises removing a lengthwise strip from a rough ring tub to form an opening longitudinally of the tub, compressing the tub to close such opening, and turning the outer surface of the tub to a predetermined diameter, simultaneously forming a plurality of spaced annular grooves in the outer surface of the tub, and cutting the inner surface of the tub to a predetermined diameter intersecting said grooves to cut rings singly from said tub while the latter is under compression.

2. The method of forming packing rings which comprises cutting a rough cast ring tub longitudinally to form a longitudinal opening therein having spaced flat edges, compressing the tub to bring such edges into flat engagement with each other and holding the tub so compressed, and turning the outer surface of the tub to a predetermined diameter, simultaneously forming a plurality of spaced annular grooves in the outer surface of the tub, and cutting the inner surface of the tub to a predetermined diameter intersecting said grooves to cut rings singly from the tub while the latter is held under compression.

3. The method of manufacturing packing rings which comprises removing a lengthwise strip from a rough ring tub to form an opening longitudinally of the tub, compressing the tub to close such opening, and turning the outer surface of the tub to a predetermined diameter, simultaneously forming a plurality of spaced annular grooves in the outer surface of the tub, cutting the inner surface of the tub to a predetermined diameter intersecting said grooves to cut rings singly from said tub while the latter is under compression, and cutting each ring as it is being thus separated from the tub to form an offset portion.

FRANK A. BEYER, Jr.